000

US008032734B2

(12) United States Patent
Svendsen et al.

(10) Patent No.: US 8,032,734 B2
(45) Date of Patent: Oct. 4, 2011

(54) COPROCESSOR LOAD DATA QUEUE FOR INTERFACING AN OUT-OF-ORDER EXECUTION UNIT WITH AN IN-ORDER COPROCESSOR

(75) Inventors: Kjeld Svendsen, San Jose, CA (US); Maria Ukanwa, Morgan Hill, CA (US)

(73) Assignee: MIPS Technologies, Inc., Sunnyvale, CA (US)

( * ) Notice: Subject to any disclaimer, the term of this patent is extended or adjusted under 35 U.S.C. 154(b) by 441 days.

(21) Appl. No.: 11/515,723

(22) Filed: Sep. 6, 2006

(65) Prior Publication Data
US 2008/0059765 A1 Mar. 6, 2008

(51) Int. Cl.
*G06F 9/30* (2006.01)
(52) U.S. Cl. .............................. 712/34; 712/216; 712/220
(58) Field of Classification Search .................. 712/29, 712/34, 35, 216, 200
See application file for complete search history.

(56) References Cited

U.S. PATENT DOCUMENTS

| | | |
|---|---|---|
| 5,091,851 A | 2/1992 | Shelton et al. |
| 5,109,520 A | 4/1992 | Knierim |
| 5,325,511 A | 6/1994 | Collins et al. |
| 5,493,523 A | 2/1996 | Huffman |
| 5,493,667 A | 2/1996 | Huck et al. |
| 5,510,934 A | 4/1996 | Brennen et al. |
| 5,526,504 A | 6/1996 | Hsu et al. |
| 5,537,538 A | 7/1996 | Bratt et al. |
| 5,546,545 A | 8/1996 | Rich |
| 5,568,630 A | 10/1996 | Killian et al. |
| 5,572,704 A | 11/1996 | Bratt et al. |
| 5,586,278 A | 12/1996 | Papworth et al. |
| 5,590,351 A | 12/1996 | Sowadsky et al. |
| 5,604,909 A | 2/1997 | Joshi et al. |
| 5,606,683 A | 2/1997 | Riordan |
| 5,632,025 A | 5/1997 | Bratt et al. |
| 5,670,898 A | 9/1997 | Fang |
| 5,734,881 A | 3/1998 | White et al. |
| 5,740,402 A | 4/1998 | Bratt et al. |

(Continued)

FOREIGN PATENT DOCUMENTS

GB 2304215 A 3/1997

(Continued)

OTHER PUBLICATIONS

Jeong et al., "The Design and Implementation of CalmRISC32 Floating Point Unit," 2000, pp. 327-330.*

(Continued)

*Primary Examiner* — David Huisman
(74) *Attorney, Agent, or Firm* — Sterne, Kessler, Goldstein & Fox P.L.L.C.

(57) ABSTRACT

A coprocessor interface unit for interfacing a coprocessor to an out-of-order execution pipeline, and applications thereof. In an embodiment, the coprocessor interface unit includes an in-order instruction queue, a coprocessor load data queue, and a coprocessor store data queue. Instructions are written into the in-order instruction queue by an instruction dispatch unit. Instructions exit the in-order instruction queue and enter the coprocessor. In the coprocessor, the instructions operate on data read from the coprocessor load data queue. Data is written back, for example, to memory or a register file by inserting the data into the out-of-order execution pipeline, either directly or via the coprocessor store data queue, which writes back the data.

29 Claims, 10 Drawing Sheets

U.S. PATENT DOCUMENTS

| | | | |
|---|---|---|---|
| 5,758,112 A | 5/1998 | Yeager et al. | |
| 5,764,999 A | 6/1998 | Wilcox et al. | |
| 5,765,037 A | 6/1998 | Morrison et al. | |
| 5,781,753 A | 7/1998 | McFarland et al. | |
| 5,784,584 A | 7/1998 | Moore et al. | |
| 5,799,165 A | 8/1998 | Favor et al. | |
| 5,802,339 A | 9/1998 | Sowadsky et al. | |
| 5,802,386 A | 9/1998 | Kahle et al. | |
| 5,809,326 A | 9/1998 | Nogami | |
| 5,809,336 A | 9/1998 | Moore et al. | |
| 5,848,433 A | 12/1998 | Tran et al. | |
| 5,881,257 A | 3/1999 | Glass et al. | |
| 5,884,061 A | 3/1999 | Hesson et al. | |
| 5,909,565 A * | 6/1999 | Morikawa et al. | 712/200 |
| 5,954,815 A | 9/1999 | Joshi et al. | |
| 5,961,629 A | 10/1999 | Nguyen et al. | |
| 5,966,734 A | 10/1999 | Mohamed et al. | |
| 6,044,478 A | 3/2000 | Green | |
| 6,076,159 A | 6/2000 | Fleck et al. | |
| 6,079,014 A | 6/2000 | Papworth et al. | |
| 6,085,315 A | 7/2000 | Fleck et al. | |
| 6,216,200 B1 | 4/2001 | Yeager | |
| 6,223,278 B1 | 4/2001 | Morrison | |
| 6,247,124 B1 | 6/2001 | Joshi et al. | |
| 6,249,862 B1 | 6/2001 | Chinnakonda et al. | |
| 6,266,755 B1 | 7/2001 | Yeager | |
| 6,269,436 B1 | 7/2001 | Tran et al. | |
| 6,298,438 B1 | 10/2001 | Thayer et al. | |
| 6,304,960 B1 | 10/2001 | Yeh et al. | |
| 6,308,252 B1 | 10/2001 | Agarwal et al. | |
| 6,393,550 B1 | 5/2002 | Fetterman | |
| 6,430,655 B1 | 8/2002 | Courtright et al. | |
| 6,473,837 B1 | 10/2002 | Hughes et al. | |
| 6,477,639 B1 | 11/2002 | Krishnan et al. | |
| 6,505,285 B1 | 1/2003 | Rabinovici et al. | |
| 6,546,477 B1 | 4/2003 | Russo et al. | |
| 6,557,127 B1 | 4/2003 | Adams et al. | |
| 6,594,728 B1 | 7/2003 | Yeager | |
| 6,598,148 B1 | 7/2003 | Moore et al. | |
| 6,691,221 B2 | 2/2004 | Joshi et al. | |
| 6,754,804 B1 | 6/2004 | Hudepohl et al. | |
| 6,757,817 B1 | 6/2004 | Booth | |
| 6,760,835 B1 | 7/2004 | Yu | |
| 6,782,445 B1 * | 8/2004 | Olgiati et al. | 711/100 |
| 6,836,833 B1 | 12/2004 | Kinter et al. | |
| 6,915,395 B1 | 7/2005 | Singh | |
| 7,032,226 B1 | 4/2006 | Nemirovsky et al. | |
| 7,389,403 B1 * | 6/2008 | Alpert et al. | 712/10 |
| 7,647,475 B2 | 1/2010 | Svendsen et al. | |
| 2004/0044878 A1 * | 3/2004 | Evans et al. | 712/34 |
| 2004/0193858 A1 | 9/2004 | Ahmad et al. | |
| 2005/0102483 A1 | 5/2005 | Kinter et al. | |
| 2005/0246499 A1 | 11/2005 | Saida et al. | |
| 2006/0095732 A1 | 5/2006 | Tran et al. | |
| 2006/0149904 A1 | 7/2006 | Mowry | |
| 2006/0259747 A1 | 11/2006 | Gonzalez et al. | |
| 2007/0214298 A1 * | 9/2007 | Sullivan et al. | 710/110 |
| 2008/0046692 A1 | 2/2008 | Michalak et al. | |

FOREIGN PATENT DOCUMENTS

| | | |
|---|---|---|
| GB | 2322718 A | 9/1998 |
| WO | WO 02/082278 A1 | 10/2002 |

OTHER PUBLICATIONS

ADSP-21535 Blackfin™ DSP Brochure, Analog Devices, Inc., 4 pages (2001).

*Andes R10000 User's Manual*, Revision 2.0, MIPS Technologies, Inc., Entire Text (Sep. 19, 1996).

Arvind, A. and Maessen, J.-W., "Memory Model =Instruction Reordering + Store Atomicity," *ACM SIGARCH Computer Architecture News*, vol. 34, Issue 2, pp. 29-40 (May 2006).

Banakar, R. et al., "Scratchpad Memory: A Design Alternative for Cache On-chip memory in Embedded Systems," *Proceedings of CODES '02*, ACM, Estes Park, Colorado, pp. 73-78 (May 2002).

Bellas, N. et al., "Architectural and Compiler Techniques for Energy Reduction in High-Performance Microprocessors," *IEEE Trans. on Very Large Scale Integration (VLSI) Systems*, vol. 8, No. 3, pp. 317-326 (Jun. 2000).

Bird, P.L. et al., "The Effectiveness of Decoupling," *Proceedings of the 7th Int'l Conference on Supercomputing*, pp. 47-56, ACM Press, New York, NY (1993).

Bratt, J.P. et al., U.S. Appl. No. 08/168,094, filed Dec. 15, 1993, entitled "Superscalar Microprocessor Instruction Pipeline Including Instruction Dispatching and Kill Control".

Buti, T.N. et al., "Organization and implementation of the register-renaming mapper for out-of-order IBM POWER4 processors," *IBM J. Res. & Dev.* 49(1):167-188, International Business Machines Corporation (Jan. 2005).

Cotterell, S. and Vahid, F., "Tuning of Loop Cache Architecture to Programs in Embedded System Design," *ISSS'02*, 6 pages (Oct. 2002).

Courtright, D., "Introducing: The MIPS32™ 4Kc™ and MIPS32™ 4Kp™ Processor Cores 'Jade'," paper copy of slide presentation distributed at the Embedded Microprocessor Forum, pp. 1-25 (May 1999).

Dally, W.J. et al., U.S. Appl. No. 09/637,500, filed Aug. 11, 2000, entitled "High Performance RISC Instruction Set Digital Signal Processor Having Circular Buffer and Looping Controls".

De Vries, H., *Understanding the detailed Architecture of AMD's 64 bit Core*, 85 pages, printed Oct. 16, 2007 from http://chip-architect.com/news/2003_09_21_Detailed_Architecture_of_AMDs_64bit_Core.html (Sep. 21, 2003).

Flynn et al., "Using Simple Tools to Evaluate Complex Architectural Trade-Offs," *IEEE Micro*, pp. 67-75 (Jul.-Aug. 2000).

Fukuoka, K. et al., "Leakage Power Reduction for Clock Gating Scheme on PD-SOI," *IEEE Computer Society Int'l Symp. On Circuits and Systems*, pp. 613-616 (2004).

Goodman, J.R. et al., "PIPE: A VLSI Decoupled Architecture," *ACM SIGARCH Computer Architecture News*, pp. 20-27, ACM Press, New York, NY (Jun. 1985).

Gwennap, L., "MIPS R10000 Uses Decoupled Architecture," *Microprocessor Report*, vol. 8, No. 14, pp. 1-5 (Oct. 24, 1994).

Gwennap, L., "MIPS R12000 to Hit 300 MHz," *Microprocessor Report*, vol. 11, No. 13, pp. 1-4 (Oct. 6, 1997).

Gwennap, L., "MIPS Roadmap Focuses on Bandwidth," *Microprocessor Report*, pp. 1-3 (May 12, 1997).

Gwennap, L., "SGI Provides Overview of TFP CPU," *Microprocessor Report*, vol. 7, No. 2, pp. 1-2 (Feb. 15, 1993).

Gwennap, L., "TFP Designed for Tremendous Floating Point," *Microprocessor Report*, vol. 7, No. 11, pp. 1-5 (Aug. 23, 1993).

Hennessy, J.L. and Patterson, D.A., *Computer Architecture: A Quantitative Approach—Third Edition*, Morgan Kaufmann Publishers, ISBN 1-55860-724-2, pp. 608-609 (2003).

*Intel Architecture Software Developer's Manual*—vol. 2: Instruction Set Reference, Intel. Corporation, pp. 3-278 and 3-279 (1997).

*Intel Architecture Software Developer's Manual*, vol. 1-3, pp. 2-7, 2-10, 2-11, 2-12, 3-329, 9-16, A-10, and A-20 (1999).

*Intel® StrongARM® SA-1100 Microprocessor Developer's Manual*, Intel. Corporation, pp. i-xix, 1-1 through 1-7, 2-1 through 2-8, and 6-1 through 6-7 (Aug. 1999).

Kandemir, M. et al., "Dynamic Management of Scratch-Pad Memory Space," *Proceedings of the 38th Design Automation Conference*, ACM, Las Vegas, Nevada, pp. 690-695 (Jun. 2001).

Kandemir, M. et al., "Exploiting Scratch Pad Memory Using Presburger Formulas," *Proceedings of ISSS '01*, ACM, Montreal, Quebec, Canada, pp. 7-12 (Oct. 2001).

Kandemir, M. et al., "Exploiting Shared Scratch Pad Memory Space in Embedded Multiprocessor Systems," *Proceedings of the 39th Design Automation Conference*, ACM, New Orleans, Louisiana, pp. 219-224 (Jun. 2002).

Kiyohara, T. et al., "Register Connection: A New Approach to Adding Registers into Instruction Set Architectures," *Int'l Conf on Computer Architecture—Proc. of the 20th Annual Int'l. Symp. on Computer Architecture*, San Diego, CA, pp. 247-256 (1993).

Krewell, K., "Intel Looks To Core for Success", Microprocessor Report, vol. 20, pp. 1, 4, 5 and 6 (Mar. 2006).

Lee, L.H. et al., "Instruction Fetch Energy Reduction Using Loop Caches for Embedded Applications with Small Tight Loops," *ISLPED'99*, pp. 267-269 (1999).

Lipasti, M. et al., "Physical Register Inlining," at <http://www.ece.wise.edu/~pharm/papers/isca2004_egunadi.pdf>, 11 pages (retrieved Jun. 12, 2006).

Merten, M.C. et al., "Modulo Schedule Buffers", IEEE, pp. 138-149 (Dec. 2001).

*MIPS R10000 Microprocessor User's Manual, Version 2.0*, MIPS Technologies, Inc., 424 pages (Jan. 29, 1997).

Nass, R., "Latest DSPs Poised to Drive 3G Revolution," *Portable Design* 8(9):26, 27, 28, 32, and 34, PennWell Corporation, Fair Lawn, New Jersey (Sep. 2001).

Nemirovsky, M. et al., U.S. Appl. No. 09/602,279, filed Jun. 23, 2000, entitled "Methods and Apparatus for Background Memory Management".

Osborne, M. et al., "Superscalar Pipeline Architectures," Slide Presentation, 36 pages, downloaded Jun. 19, 2007 from http://www.academic.marist.edu/~jzbv/architecture/projects2004/SuperscalarArchitectures.ppt (Apr. 19, 2004).

Panda, P. et al., "Data Memory Organization and Optimizations in Application-Specific Systems," *IEEE Design & Test of Computers*, IEEE, pp. 56-68 (May 2001).

Panda, P. et al., "Efficient Utilization of Scratch-Pad Memory in Embedded Processor Applications," *Proceedings of the European Design & Test Conference ED&TC 97*, IEEE, Paris France, pp. 7-11 (Mar. 1997).

Peng, M. and Azgomi, S., "Content-Addressable memory (CAM) and its network applications," at http://www.eetasia.com/Articles/2000MAY/2000MAY03_MEM_NTEK_TAC.PDF, 3 pages (retrieved Jun. 12, 2006).

Pierce, J. and Mudge, T., "Wrong-Path Instruction Prefetching," *IEEE Computer Society 29th Int'l Symp. on Microarchitecture*, pp. 165-175 (1996).

Price, C., *MIPS R10000 MIPS IV ISA Manual: Andes*, Revision 3.2, MIPS Technologies, Inc., 323 pages (Sep. 1995).

Rhodes, S., *MIPS R8000 Microprocessor Chip Set User's Manual*, Revision 3.0, Silicon Graphics, Inc., 352 pages (Jul. 1994).

Schmidt, D.C., "Transparently Parameterizing Synchronization into a Concurrent Distributed Application: A Case Study of C++Design Evolution," *C++ Report*, SIGS Publications, vol. 6, No. 3, 10 pages (Jul.-Aug. 1994).

Smith, J.E. et al., "The ZS-1 Central Processor," *Proceedings of the Second Int'l Conference on Architectural Support for Programming Languages and Operating Systems*, pp. 199-204, IEEE Computer Society Press, Los Alamitos, CA (1987).

Smith, J.E., "Retrospective: Decoupled Access/Execute Architectures," *25 Years of the international Symposia on Computer Architecture (Selected Papers)*, pp. 27-28, ACM Press, New York, NY (Jun. 1998).

Solomon, B. et al., "Micro-Operation Cache: A Power Aware Frontend for Variable Instruction Length ISA," *Symp. on Low Power Electronics and Design*, pp. 4-9 (Aug. 2001).

*SPARC64 V Processor for UNIX Server*, Revision 1.0, Fujitsu Limited, 24 pages (Aug. 2004).

Sung, M. et al., "Multithreading Decoupled Architectures for Complexity-Effective General Purpose Computing," *ACM SIGARCH Computer Architecture News*, vol. 29—Issue 5, pp. 56-61, ACM Press, New York, NY (Dec. 2001).

Taylor, M., *The Raw Prototype Design Document*, Dept. of Electrical Engineering and Computer Science—Massachusetts Institute of Technology, pp. 1, 5, 6, 10, and 53 (Nov. 1999).

$V_R$ Series™ User's Manual:$V_R$10000™ *Microprocessor, Version 1.0*, NEC, Entire Text (Nov. 1995).

Watts, C. et al., "ARM Intelligent Energy Manager Future Evolution," paper slide presentation distributed at the ARM Developers' Conference '04, 34 sheets (Oct. 2004).

Yeager, K.C., "The MIPS R10000 Superscalar Microprocessor," *IEEE Micro*, pp. 28-40 (1996).

Svendsen, K. and Ukanwa, M., U.S. Appl. No. 11/515,720, filed Sep. 6, 2006, entitled "Out-of-Order Processor Having an In-Order Coprocessor, and Applications Thereof".

Office Communication, dated Apr. 25, 2008, for U.S. Appl. No. 11/515,720, filed Sep. 6, 2006, 6 pages.

Office Communication, dated Aug. 20, 2008, for U.S. Appl. No. 11/515,720, filed Sep. 6, 2006, 5 pages.

Office Communication, dated Jan. 16, 2009, for U.S. Appl. No. 11/515,720, filed Sep. 6, 2006, 6 pages.

Office Communication, dated May 15, 2009, for U.S. Appl. No. 11/515,720, filed Sep. 6, 2006, 6 pages.

* cited by examiner

US 8,032,734 B2

COPROCESSOR LOAD DATA QUEUE FOR INTERFACING AN OUT-OF-ORDER EXECUTION UNIT WITH AN IN-ORDER COPROCESSOR

CROSS REFERENCE TO RELATED APPLICATION

This application is related to commonly owned U.S. patent application Ser. No. 11/515,720, titled "OUT-OF-ORDER PROCESSOR HAVING AN IN-ORDER COPROCESSOR, AND APPLICATIONS THEREOF," filed on Sep. 6, 2006, which is incorporated herein by reference in its entirety.

FIELD OF THE INVENTION

The present invention generally relates to processors, coprocessor interface units, and applications thereof.

BACKGROUND OF THE INVENTION

Reduced Instruction Set Computer (RISC) processors are well known. RISC processors have instructions that facilitate the use of a technique known as pipelining. Pipelining enables a processor to work on different steps of an instruction at the same time and thereby take advantage of parallelism that exists among the steps needed to execute an instruction. As a result, a processor can execute more instructions in a shorter period of time. Additionally, modern Complex Instruction Set Computer (CISC) processors often translate their instructions into micro-operations (i.e., instructions similar to those of a RISC processor) prior to execution to facilitate pipelining.

Many pipelined processors, especially those used in the embedded market, are relatively simple single-threaded in-order machines. As a result, they are subject to control, structural, and data hazard stalls. More complex processors are typically multi-threaded processors that have out-of-order execution pipelines. These more complex processors schedule execution of instructions around hazards that would stall an in-order machine.

What is needed are techniques, apparatuses and methods for interfacing processors having out-of-order execution pipelines to coprocessors having in-order execution pipelines.

BRIEF SUMMARY OF THE INVENTION

The present invention provides apparatuses, systems, and methods for interfacing processors having out-of-order execution pipelines to coprocessors having in-order execution pipelines, and applications thereof. In an embodiment, a coprocessor interface unit provides an interface between a coprocessor and a processor pipeline that executes instruction out-of-program order. The coprocessor interface unit includes an in-order instruction queue, a coprocessor load data queue, and a coprocessor store data queue. Instructions are written into the in-order instruction queue by an instruction dispatch unit. Instructions exit the in-order instruction queue and enter the coprocessor. In the coprocessor, the instructions operate on data read from the coprocessor load data queue. Data is written back, for example, to memory or a register file by inserting the data into an out-of-order execution pipeline, either directly or via the coprocessor store data queue, which writes back the data.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 2:
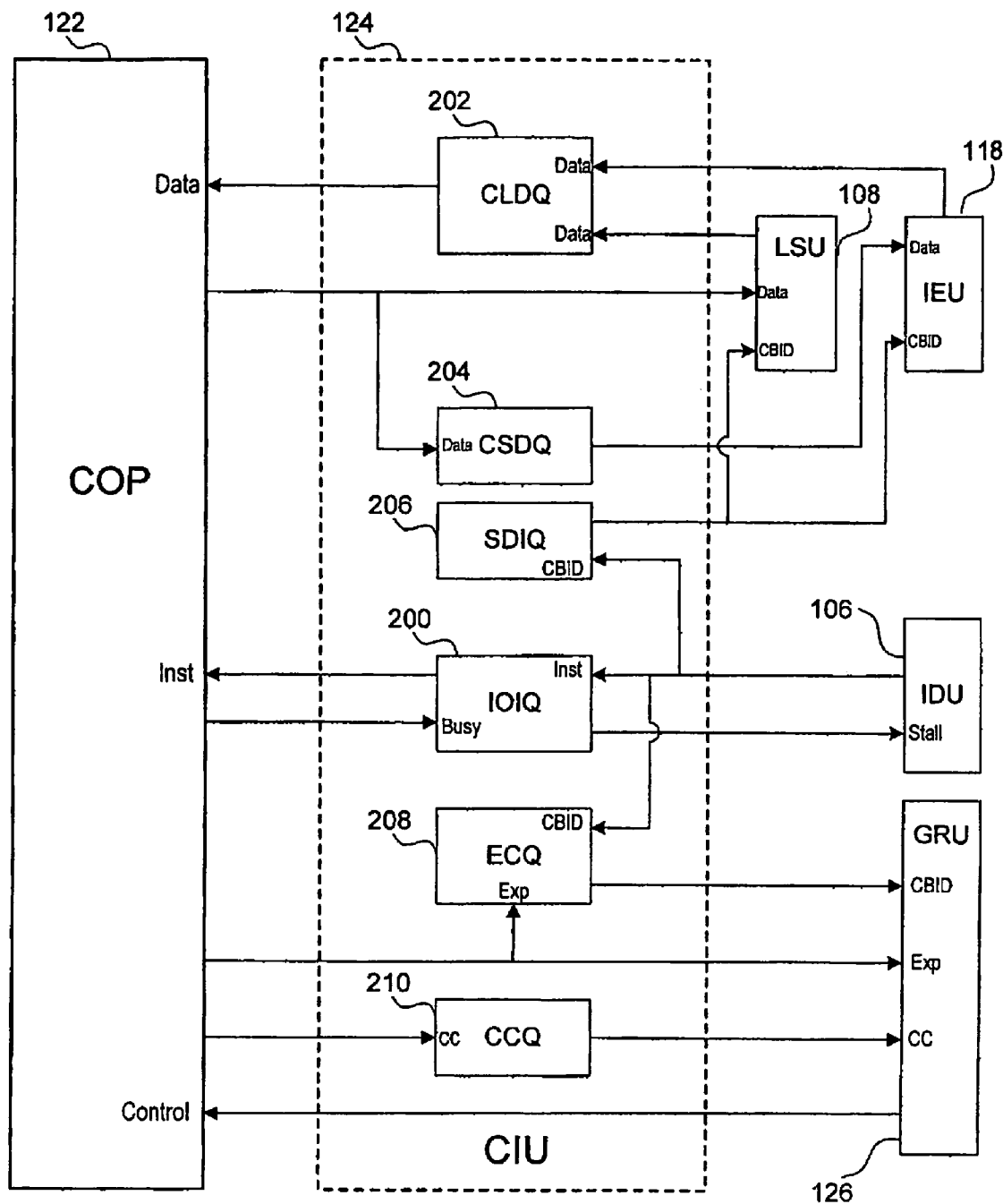

FIG. 2. is a diagram of a coprocessor interface unit according to an embodiment of the present invention.

Figure 3:
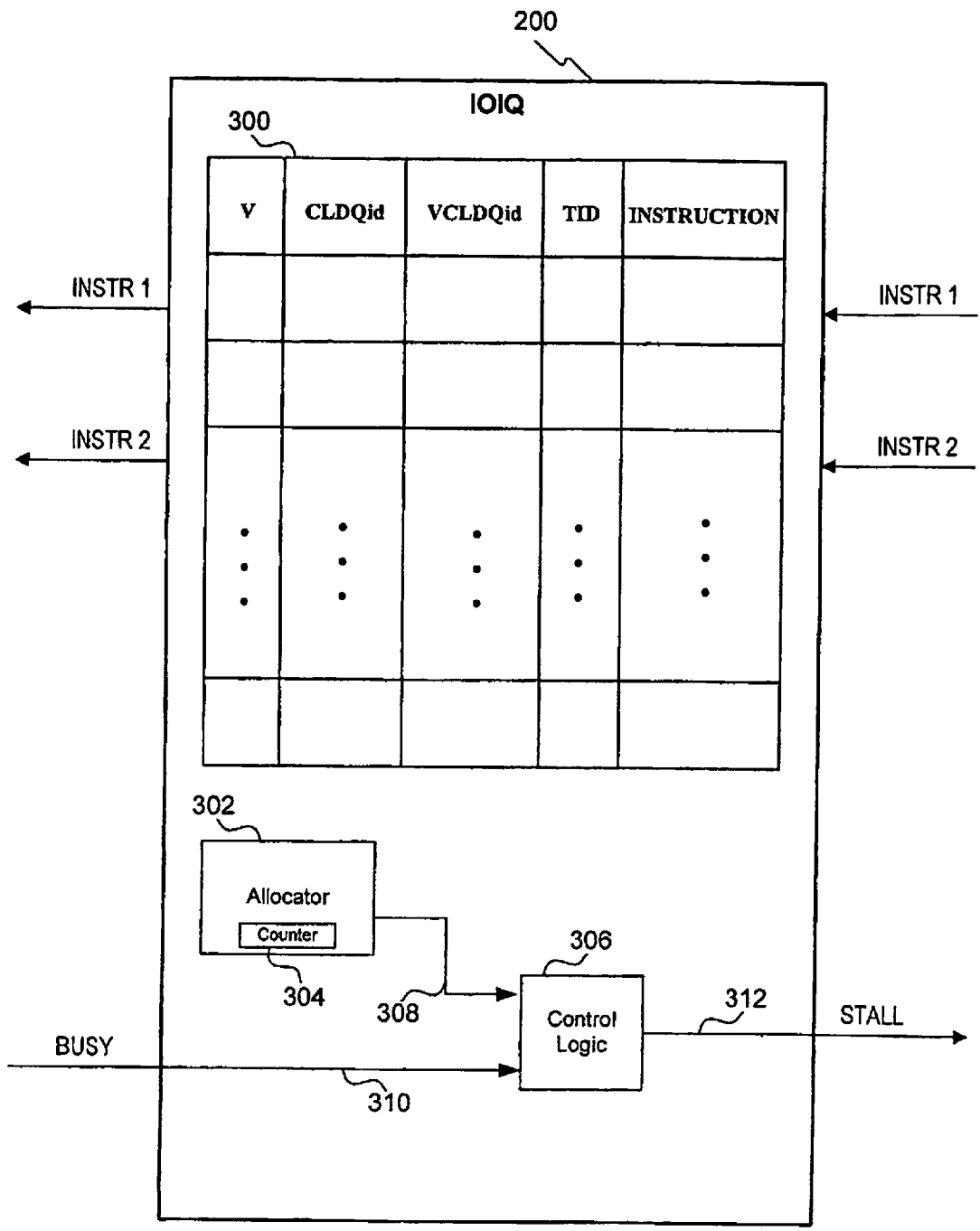

FIG. 3 is a diagram of an in-order instruction queue according to an embodiment of the present invention.

Figure 4:
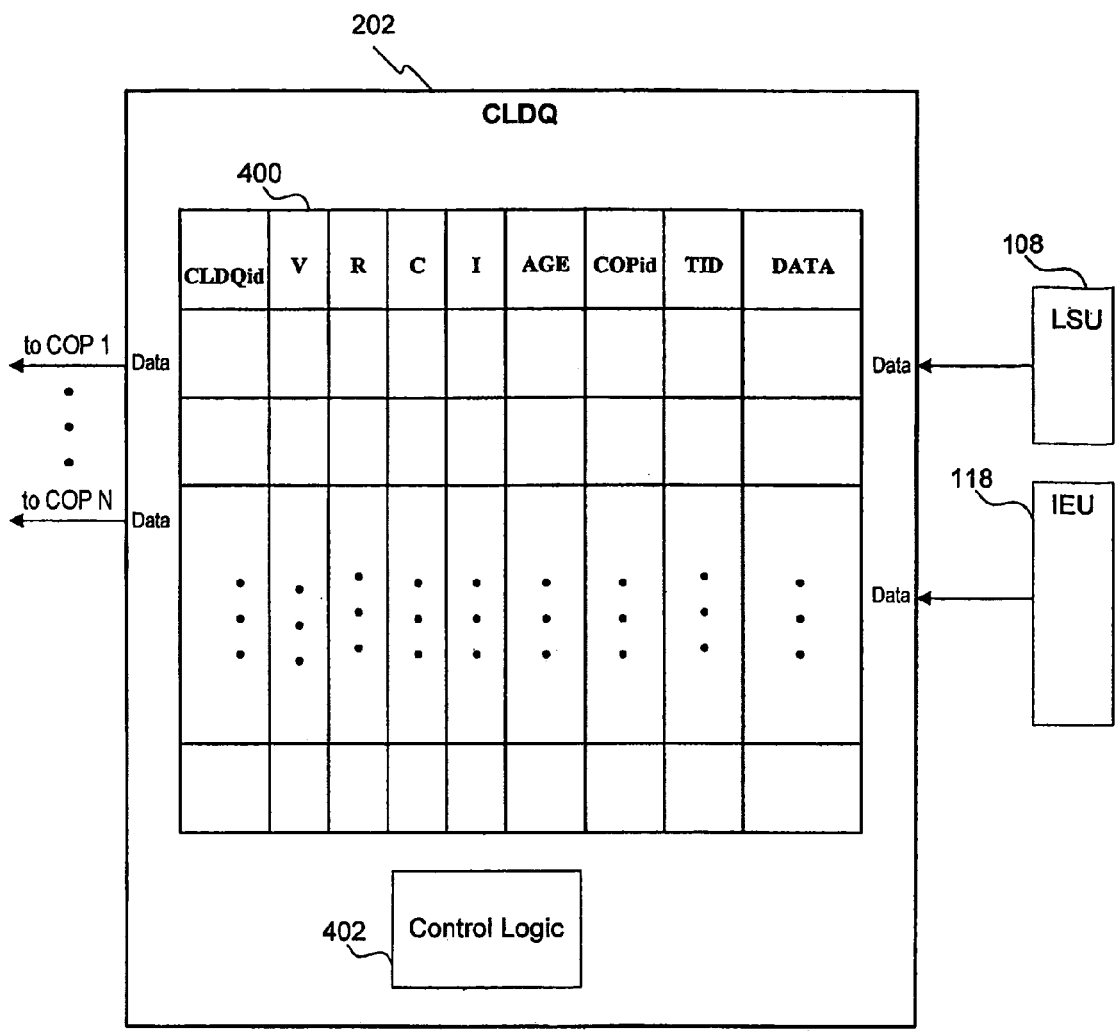

FIG. 4 is a diagram of a coprocessor load data queue according to an embodiment of the present invention.

Figure 5:
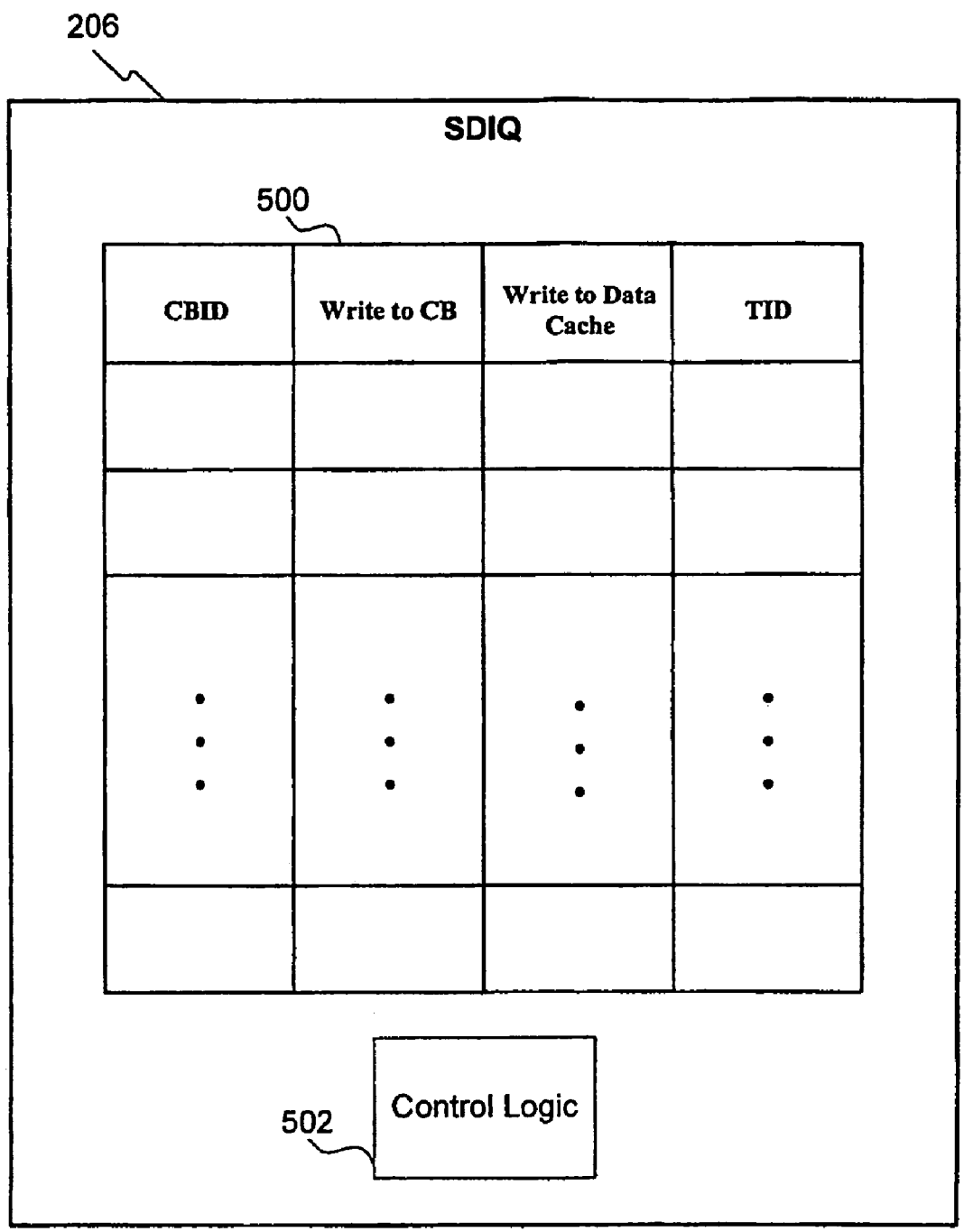

FIG. 5 is a diagram of a store data identification queue according to an embodiment of the present invention.

Figure 6:
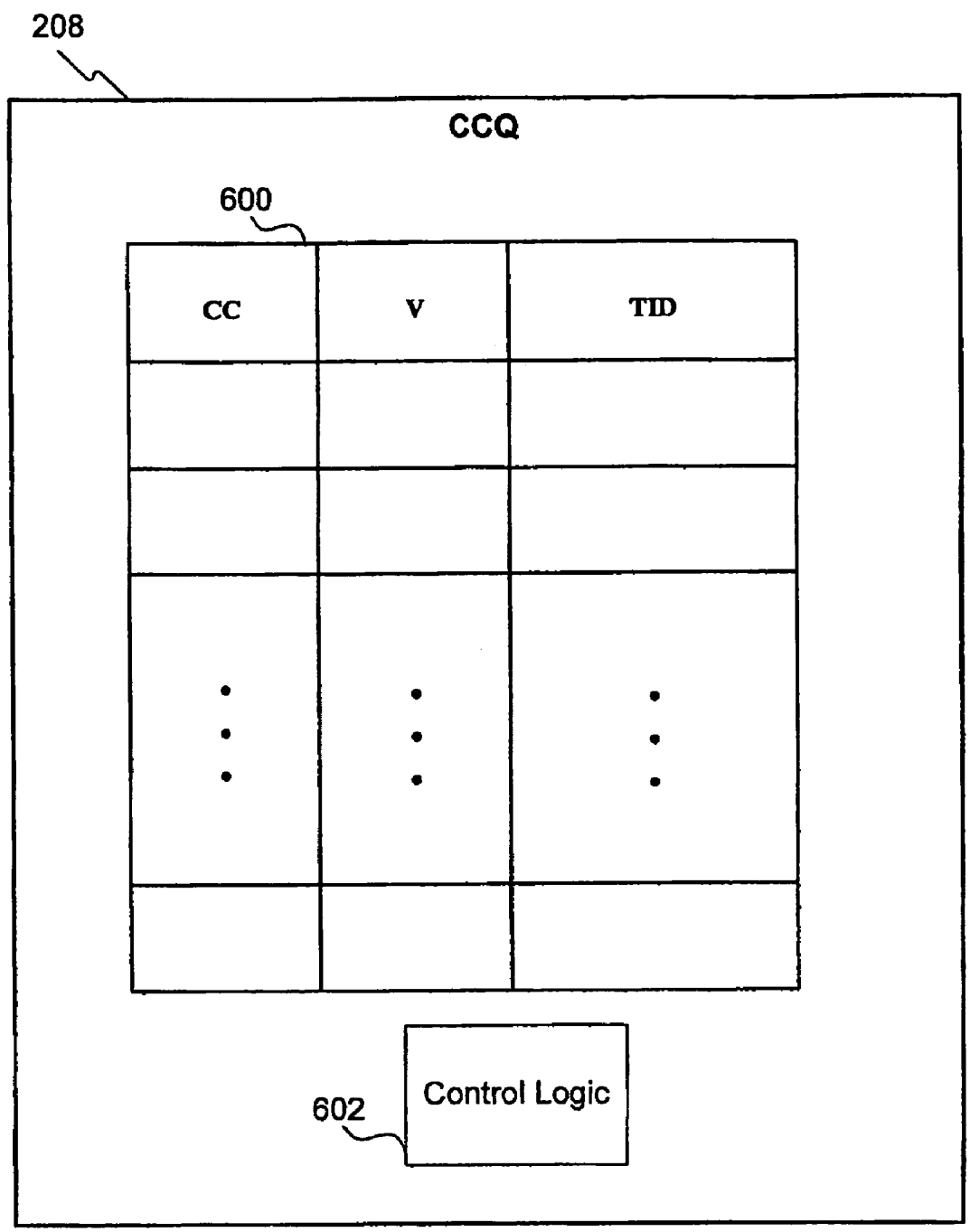

FIG. 6 is a diagram of a condition codes queue according to an embodiment of the present invention.

Figure 7:
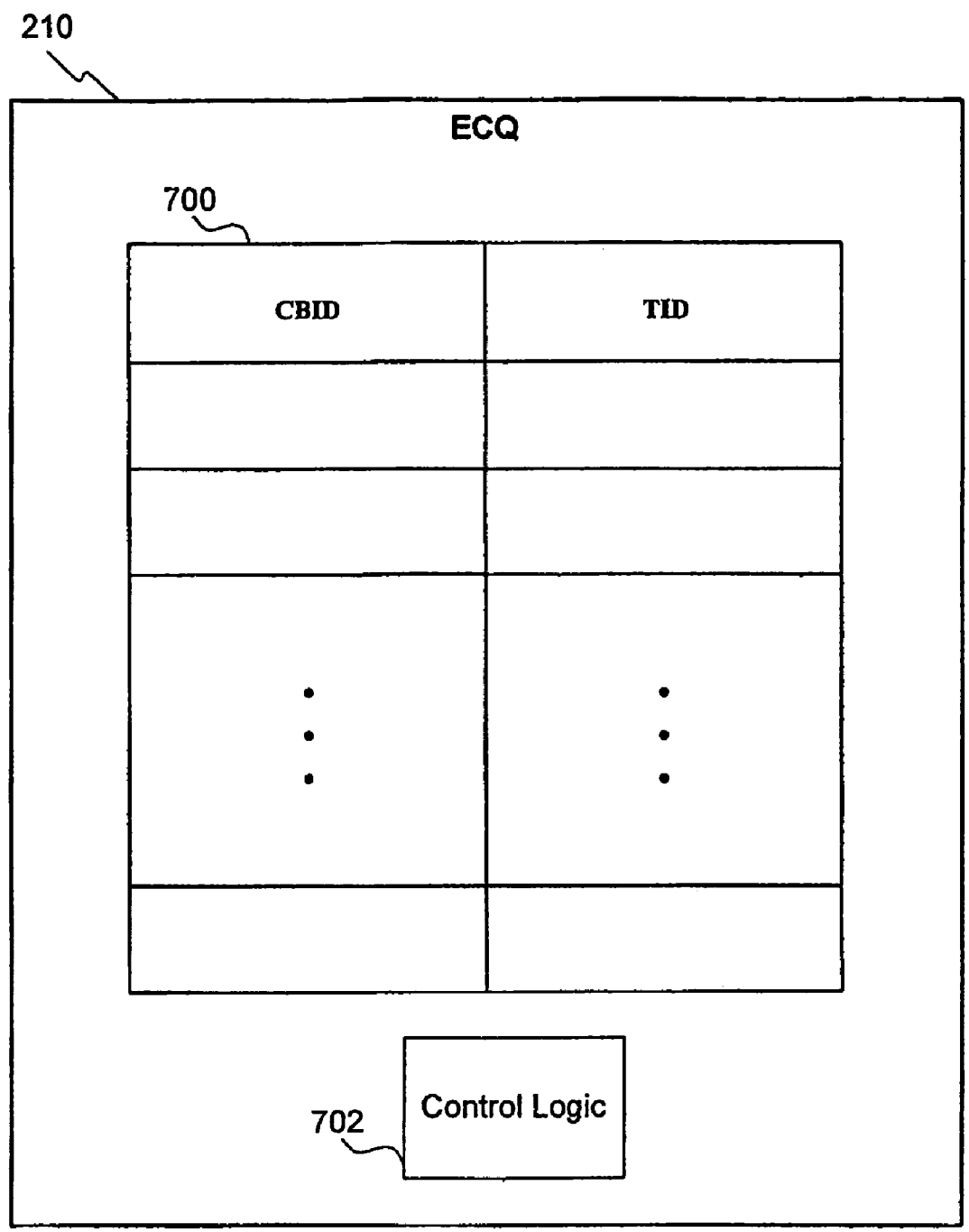

FIG. 7 is a diagram of an exception completion buffer identification queue according to an embodiment of the present invention.

Figure 8:
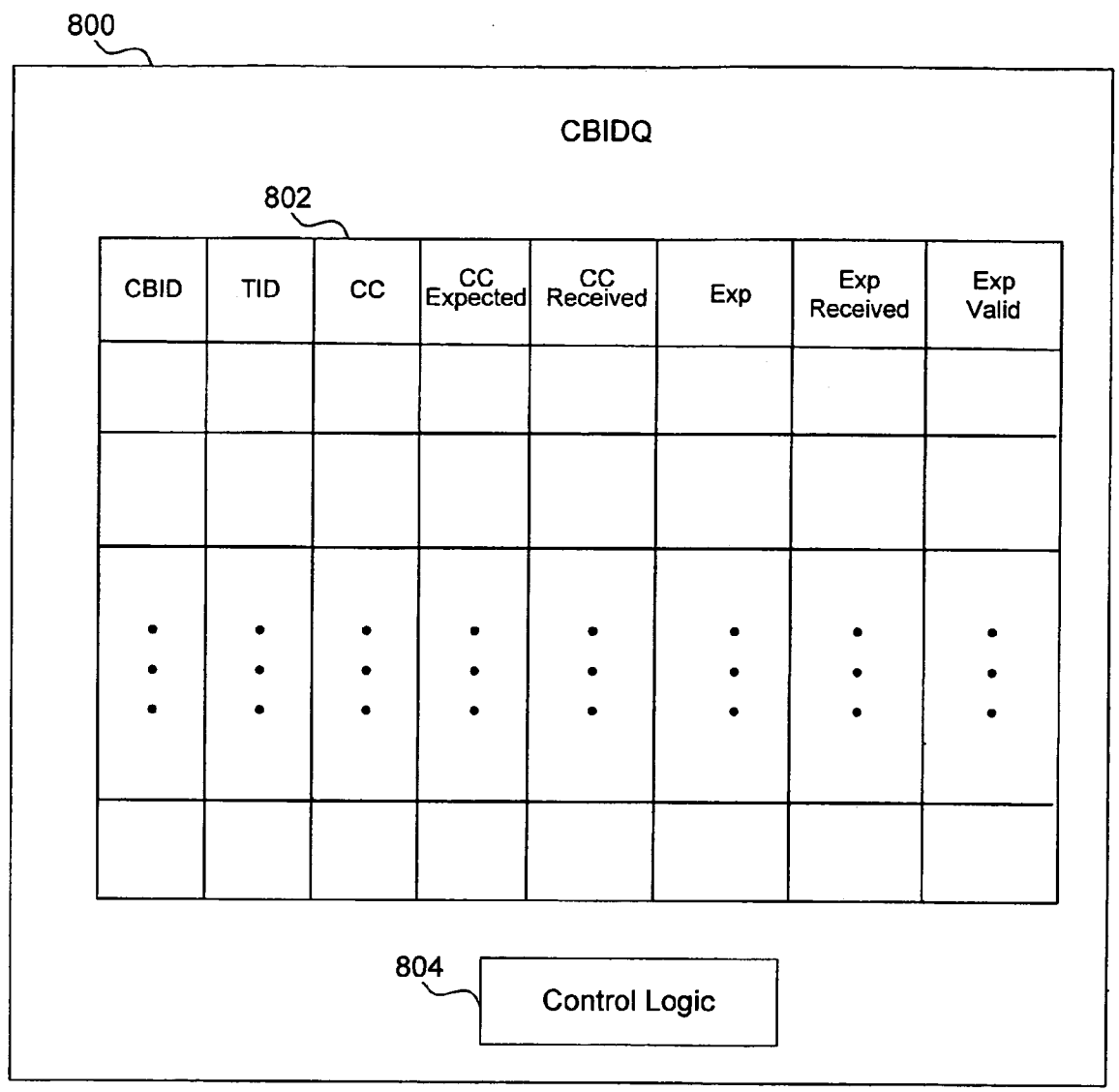

FIG. 8 is a diagram of a completion buffer identification queue according to an embodiment of the present invention.

Figure 9:
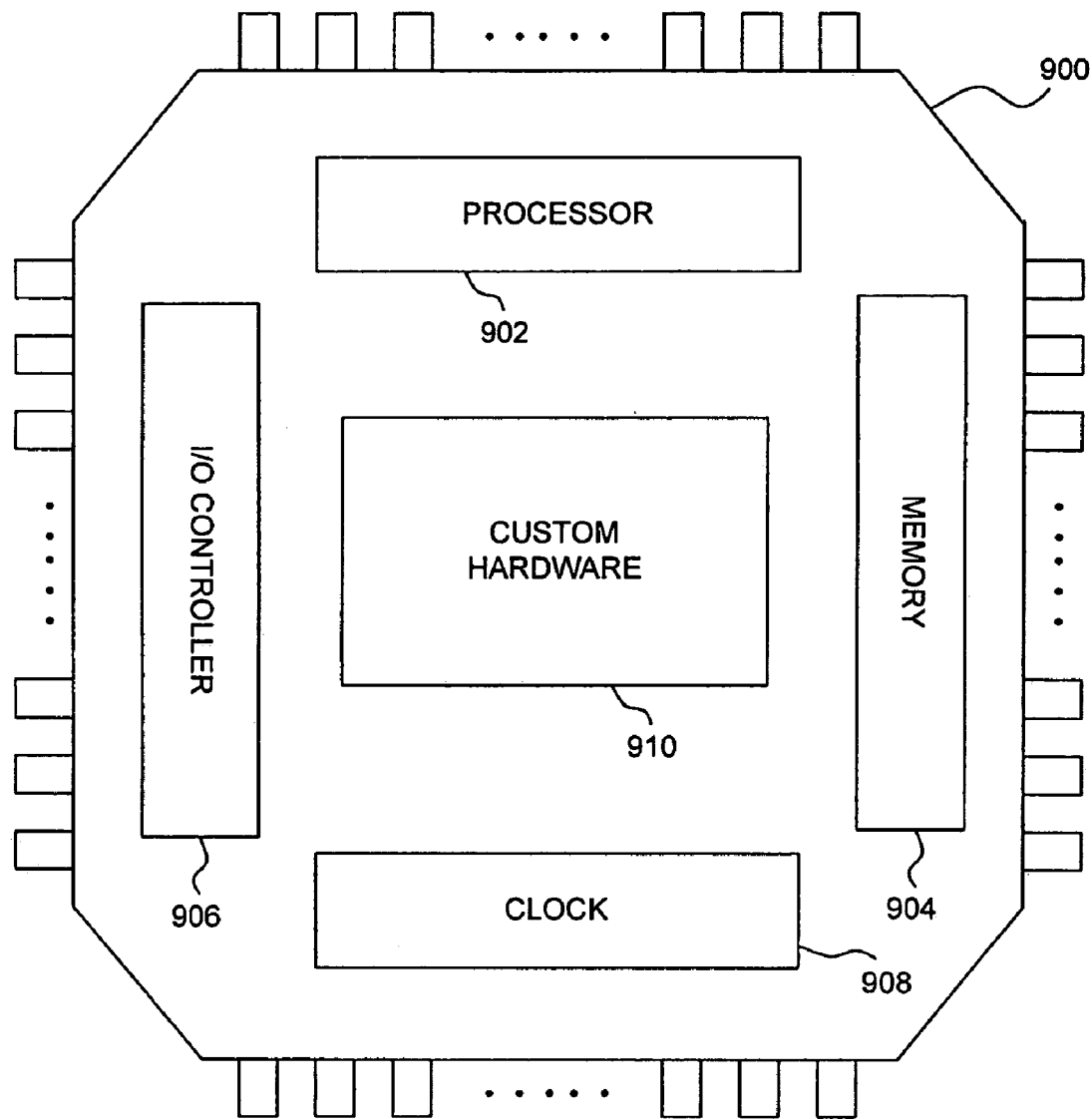

FIG. 9 is a diagram of an example system according to an embodiment of the present invention.

The present invention is described with reference to the accompanying drawings. The drawing in which an element first appears is typically indicated by the leftmost digit or digits in the corresponding reference number.

DETAILED DESCRIPTION OF THE INVENTION

The present invention provides apparatuses, systems, and methods for interfacing processors having an out-of-order execution pipeline to coprocessors have an in-order execution pipeline. In the detailed description of the invention that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1A:
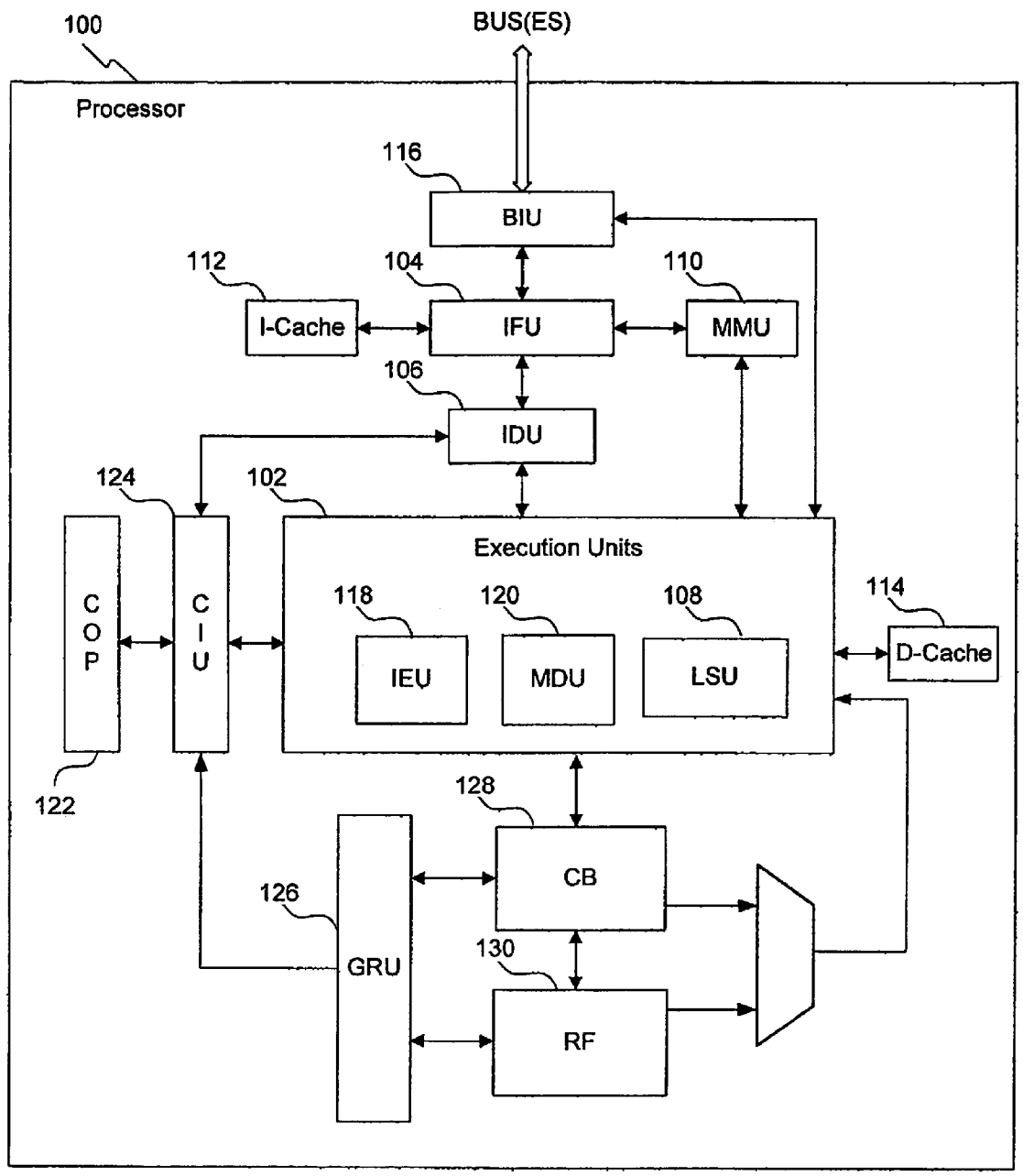
FIG. 1A is a diagram of a processor according to an embodiment of the present invention.

FIG. 1A is a diagram of a processor 100 according to an embodiment of the present invention. Processor 100 preferably implements a load-store, reduced instruction set computer (RISC) architecture. The various components and features of processor 100 illustrated in FIG. 1A are described below.

While processor 100 is described herein as including several separate components, many of these components are optional components that will not be present in each embodiment of the present invention, or components that may be combined, for example, so that the functionality of two components reside within a single component. Thus, the individual components shown for example in FIG. 1A are illustrative and not intended to limit the present invention.

As shown in FIG. 1A, processor 100 includes one or more execution units 102 that execute instructions out-of-program order and a coprocessor (COP) 122 that executes instructions in-program order. Coprocessor 122 interfaces with execution units 102 via a coprocessor interface unit (CIU) 124.

Execution units 102 preferably include an integer execution unit (IEU) 118 for handling arithmetic operations (e.g. logical, shift, add, subtract etc.) and a load/store unit (LSU) 108 for handling load/store operations and control transfer instructions. Execution units 102 also may include, for example, a multiply/divide unit (MDU) 120 to perform multiply and divide operations.

In an embodiment, execution units 102 interact with data stored in 32-bit registers in a register file (RF) 130. In addition, execution units 102 can store data in one or more completion buffers (CB) 128. In an embodiment, a first completion buffer 128 includes 64-bit registers for storing data from integer execution unit 118 and multiply/divide unit 120. A second completion buffer 128 includes 32-bit registers for storing data from load/store unit 108. Optionally, one or more additional register file sets can be included to minimize content switching overhead, for example, during interrupt and/or exception processing.

Execution units 102 interface with an instruction dispatch unit (IDU) 106, a coprocessor interface unit 124, a graduation unit (GRU) 126, a memory management unit (MMU) 110, and data cache 114.

Instruction fetch unit (IFU) 104 is responsible for providing instructions to instruction dispatch unit 106. In one embodiment, instruction fetch unit 104 includes control logic for instruction cache 112, a recoder for recoding compressed format instructions, dynamic branch prediction, an instruction buffer to decouple operation of instruction fetch unit 104 from execution units 102, and an interface to a scratch pad (not shown). Instruction fetch unit 104 interfaces with instruction dispatch unit 106, memory management unit 110, instruction cache 112, and bus interface unit (BIU) 116.

Instruction dispatch unit 106 is responsible for receiving instructions from instruction fetch unit 104 and dispatching them to execution units 102 when their operands and required resources are available, or to coprocessor interface unit 124. In an embodiment, instruction dispatch unit 106 may receive up to two instructions in order from instruction fetch unit 104 per cycle. The instructions are assigned an instruction identification value and a completion buffer value (CBID). The completion buffer identification value identifies a buffer location or entry in completion buffer 128 that can be used to hold results temporarily before they are committed to the architectural state of processor 100 by writing the results to register file 130.

Instruction dispatch unit 106 also performs operand renaming to facilitate forwarding of data. Renamed instructions are written into a decode and dispatch queue (see FIG. 1B). The oldest instructions stored in the decode and dispatch queue that have all their operands ready and meet all resource requirements are dispatched to appropriate executions module. Instructions may be dispatched out-of-program-order to execution units 102. Dispatched instructions do not stall in the execution pipe, and they write their results into completion buffer 128.

In an embodiment, instruction dispatch unit 106 also keeps track of the progress of an instruction through pipeline stages, for example, within execution units 102 and updates the availability of operands in the rename map and in all dependent instructions that are in the data dispatch queue. Instruction dispatch unit 106 also writes the instruction identification, completion buffer identification, and related information values into structures in graduation unit 126.

Load/store unit 108 is responsible for handling load/store instructions to read/write data from data caches and/or memory. Load/store unit 108 is capable of handling loads and stores issued out-of-program-order.

Memory management unit 110 translates virtual addresses to physical addresses for memory access. In one embodiment, memory management unit 110 includes a translation lookaside buffer (TLB) and may include a separate instruction TLB and a separate data TLB. Memory management unit 110 interfaces with fetch unit 104 and load/store unit 108.

Instruction cache 112 is an on-chip memory array organized as a multi-way set associative cache such as, for example, a 2-way set associative cache or a 4-way set associative cache. Instruction cache 112 is preferably virtually indexed and physically tagged, thereby allowing virtual-to-physical address translations to occur in parallel with cache accesses. In one embodiment, the tags include a valid bit and optional parity bits in addition to physical address bits. Instruction cache 112 interfaces with fetch unit 104.

Data cache 114 is also an on-chip memory array organized as a multi-way set associative cache such as, for example, a 2-way set associative cache or a 4-way set associative cache. Data cache 114 is preferably virtually indexed and physically tagged, thereby allowing virtual-to-physical address translations to occur in parallel with cache accesses. Data cache 114 interfaces with load/store unit 108.

Bus interface unit 116 controls external interface signals for processor 100. In one embodiment, bus interface unit 116 includes a collapsing write buffer used to merge write-through transactions and gather writes from uncached stores.

Integer execution unit 118 executes integer instructions. It is capable of handling instructions issued out-of-program order. Integer execution unit 118 includes an arithmetic logic unit for performing arithmetic operations such as add, subtract, shift and logic operations. Integer execution unit 118 interfaces with and operates on data stored in completion buffer 128 and register file 130.

Multiply/divide unit 120 contains a pipeline for integer multiply and divide operations. This pipeline preferably operates in parallel with the integer execution pipeline in integer execution unit 118 and has a separate write port into completion buffer 128. In an embodiment, multiply/divide unit 120 looks ahead and informs instruction dispatch unit 106 that a divide operation is about to complete so that there are no bubbles in the multiply/divide unit pipeline.

Co-processor 122 couples to execution units 102 using coprocessor interface unit 124. In an embodiment, coprocessor 122 is a floating point coprocessor that has two separate pipelines for floating point instruction execution, one for load/store instructions and one for all other instructions. These pipelines operate in parallel with the out-of-program-order pipelines of execution units 102 and do not stall when one of the out-of-order pipelines stalls. This allows long-running floating point operations, such as divide or square root, to be partially masked by system stalls and/or stalls of integer instructions. Coprocessor arithmetic instructions are always dispatched and completed in program order, but loads and stores can complete out-of-order. Execution units 102 perform the data access for load/store operations and transfer data to and from coprocessor 122 using coprocessor interface unit 124.

In other embodiment, coprocessor 122 is, for example, a graphics coprocessor, a coprocessor responsible for virtualto-physical address translation, cache protocols, etcetera. In embodiments, coprocessor 122 contains state information used, for example, for identifying and managing exceptions such as external events and/or program errors.

In embodiments of the present invention, processor 100 includes more than one coprocessor 122. These coprocessors are each interfaced to execution units 102 using one or more coprocessor interface unit 124, as described in more detail below.

Coprocessor interface unit 124 provides an interface between out-of-order execution unit 102 and coprocessor 122. As described in more detail below with reference to FIGS. 2-7, coprocessor interface unit 124 typically includes an in-order instruction queue, a coprocessor load data queue, and a coprocessor store data queue that decouple the operation of coprocessor 122 from execution units 102. In embodiments of processor 100 that include more than one coprocessor, some of the structures of coprocessor interface 124 such as the coprocessor load data queue are preferably shared structures.

Graduation unit 126 is responsible ensuring instruction graduate and change the architectural state of processor 100 in-program order. Graduation unit 126 also releases buffers and resources used by instructions prior to their graduation.

Figure 1B:
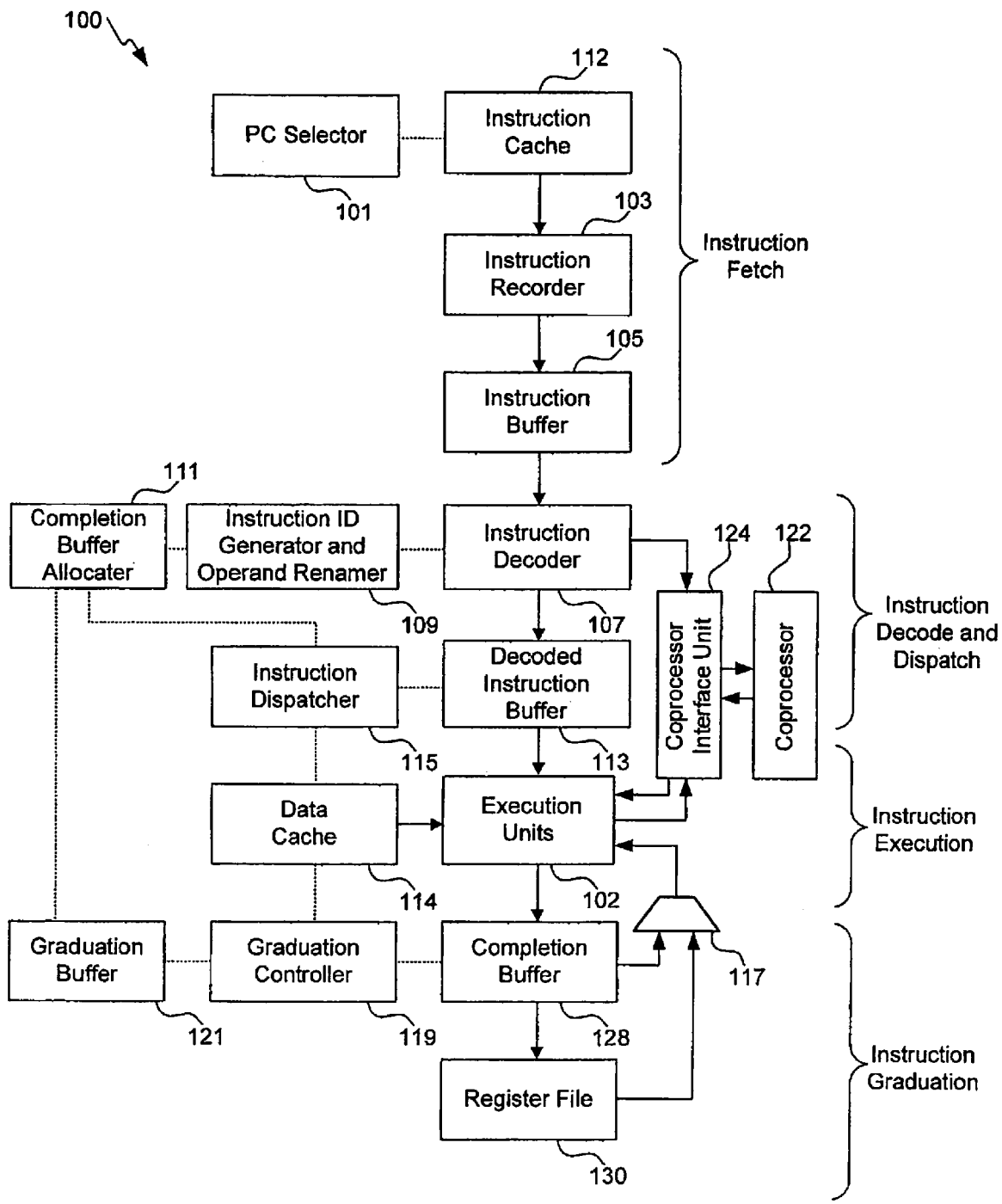
FIG. 1B is a diagram further illustrating the processor of FIG. 1A.

FIG. 1B further illustrates the operation of processor 100. As illustrated in FIG. 1B, processor 100 performs four basic functions: instruction fetch; instruction decode and dispatch; instruction execution; and instruction graduation. These four basic functions are illustrative and not intended to limit the present invention.

Instruction fetch (represented in FIG. 1A by instruction fetch unit 104) begins when a PC selector 101 selects amongst a variety of program counter values and determines a value that is used to fetch an instruction from instruction cache 112. In one embodiment, the program counter value selected is the program counter value of a new program thread, the next sequential program counter value for an existing program thread, or a redirect program counter value associated with a branch instruction or a jump instruction. After each instruction is fetched, PC selector 101 selects a new value for the next instruction to be fetched.

During instruction fetch, tags associated with an instruction to be fetched from instruction cache 112 are checked. In one embodiment, the tags contain precode bits for each instruction indicating instruction type. If these precode bits indicate that an instruction is a control transfer instruction, a branch history table is accessed and used to determine whether the control transfer instruction is likely to branch or likely not to branch.

In one embodiment, any compressed-format instructions that are fetched are recoded by an optional instruction recoder 103 into a format that can be decoded and executed by processor 100. For example, in one embodiment in which processor 100 implements both 16-bit instructions and 32-bit instructions, any 16-bit compressed-format instructions are recoded by instruction recoder 103 to form instructions having 32 bits. In another embodiment, instruction recoder 103 recodes both 16-bit instructions and 32-bit instructions to a format having more than 32 bits.

After optional recoding, instructions are written to an instruction buffer 105. In one embodiment, this stage can be bypassed and instructions can be dispatched directly to an instruction decoder 107.

Instruction decode and dispatch (represented in FIG. 1A by instruction dispatch unit 106) begins, for example, when one or more instructions are received from instruction buffer 105 and decoded by instruction decoder 107. In one embodiment, following resolution of a branch mis-prediction, the ability to receive instructions from instruction buffer 105 may be temporarily halted until selected instructions residing within the instruction execution portion and/or instruction graduation portion of processor 100 are purged.

In parallel with instruction decoding, operands are renamed. Register renaming map(s) located within instruction identification (ID) generator and operand renamer 109 are updated and used to determine whether required source operands are available, for example, in register file 130 and/or a completion buffer 128. A register renaming map is a structure that holds the mapping information between programmer visible architectural registers and internal physical registers of processor 100. Register renaming map(s) indicate whether data is available and where data is available. As will be understood by persons skilled in the relevant arts given the description herein, register renaming is used to remove instruction output dependencies and to ensure that there is a single producer of a given register in processor 100 at any given time. Source registers are renamed so that data is obtained from a producer at the earliest opportunity instead of waiting for the processor's architectural state to be updated.

Also in parallel with instruction decoding, instruction identification (ID) generator and operand renamer 109 generates and assigns an instruction identification tag to each instruction. An instruction identification tag assigned to an instruction is used, for example, to determine the program order of the instruction relative to other instructions. In one embodiment, each instruction identification tag is a thread-specific sequentially generated value that uniquely determines the program order of instructions. The instruction identification tags can be used to facilitate graduating instructions in-program order, which were executed out-of-program order.

Each decoded instruction is assigned a completion buffer identification value or tag by a completion buffer allocater 111. The completion buffer identification value determines the location in completion buffer 128 where instruction execution units 102 can write calculated results for an instruction. In one embodiment, the assignment of completion buffer identification values is accomplished using a free list. The free list contains as many entries as the number of entries in completion buffer 128. The free list can be implemented, for example, using a bitmap. A first bit of the bitmap can be used to indicate whether the completion buffer entry is either available (e.g., if the bit has a value of one) or unavailable (e.g., if the bit has a value of zero).

Assigned completion buffer identification values are written into a graduation buffer 121. In one embodiment, completion buffer completion bits associated with newly renamed instructions are reset/cleared to indicate incomplete results. As instructions complete execution, their corresponding completion buffer completion bits are set, thereby enabling the instructions to graduate and release their associated completion buffer identification values. In one embodiment, control logic (not shown) ensures that one program thread does not consume more than its share of completion buffer entries.

Decoded instructions are written to a decoded instruction buffer 113 if the instructions are to be executed by execution units 102, or to an in-order instruction queue 200 (see FIG. 2) of coprocessor interface unit 124 if the instructions are to be executed by coprocessor 122. An instruction dispatcher 115 selects instructions residing in decoded instruction buffer 113 for dispatch to execution units 102. In embodiments, instructions can be dispatched for execution out-of-program-order to execution units 102. In one embodiment, instructions are selected and dispatched, for example, based on their age (ID tags) assuming that their operands are determined to be ready. Coprocessor 122 executes instructions in-program-order.

Instruction execution units 102 execute instructions as they are dispatched. During execution, operand data is obtained as appropriate from data cache 114, register file 130, and/or completion buffer 128. A multiplexer 117 may be used to obtain the operand data from register file 130 and/or completion buffer 128. A result calculated by instruction execution units 102 for a particular instruction is written to a location/entry of completion buffer 128 specified by the instruction's associated completion buffer identification value.

Instruction graduation (represented in FIG. 1A by instruction graduation unit 126) is controlled by a graduation controller 119. Graduation controller 119 graduates instructions in accordance with the completion buffer identification values stored in graduation buffer 121. When an instruction graduates, its associated result is transferred from completion buffer 128 to register file 130. In conjunction with instruction graduation, graduation controller 119 updates, for example, the free list of completion buffer allocater 111 to indicate a change in availability status of the graduating instruction's assigned completion buffer identification value.

FIG. 2 illustrates a coprocessor interface unit 124 according to an embodiment of the present invention that interfaces an in-order execution pipe of coprocessor 122 to the out-of-order execution pipes of execution units 102. In embodiments having two or more coprocessors 122, each coprocessor preferably has its own associated copy of the structures shown in coprocessor interface unit 124 except, for example, for coprocessor load data queue (CLDQ) 202, which is shared. In embodiments, coprocessor interface unit 124 accommodates dual instruction issue with one arithmetic and one move to/from instruction duplet per cycle. In embodiments, the operating frequency of coprocessor 122 can be either that of execution units 102 or some ratio thereof such as, for example, one-half. In embodiments, coprocessor 122 is single issue based, but supports multiple threads in a multiple thread mode.

Instructions bound for coprocessor 122 are sent from instruction decoder 107 of instruction dispatch unit 106 to an in-order instruction queue (IOIQ) 200 of coprocessor interface unit 124. Instructions exit in-order instruction queue 200 and enter coprocessor 122 at which point they read data from coprocessor load data queue 202 if the data is ready. Data is passed to coprocessor 122 by load/store unit 108 and/or integer execution unit 118 through coprocessor load data queue 202 of coprocessor interface unit 124. If the data is not ready, coprocessor 122 waits for the data (e.g., from Coprocessor Store Data Queue 204) or issues ahead depending on its capability. Coprocessor load data queue 202 entries are released only after the data in it is consumed by coprocessor 122. Graduation unit 126 controls coprocessor 122 instruction graduation through a control signal.

In-order instruction queue 200 can preferably accept two instructions per cycle regardless of the issue rate of coprocessor 122. Before instructions are sent to in-order instruction queue 200, they are assigned an instruction identification value and a completion buffer identification value. Memory load instructions also have coprocessor load data queue identification values (CLDQid) allocated to them. These values are used to lookup and/or identify data stored in coprocessor load data queue 202.

In embodiments, coprocessor instructions and load/store instructions are sent to load/store unit 108 as well as to in-order instruction queue 200. Although some coprocessor instructions do not go through the main integer pipeline, they are assigned an instruction identifier. This identifier is tracked in graduation unit 126 to generate a synchronization signal that is used to indicate to coprocessor 122 that the coprocessor instruction has been cleared of all speculation and exception conditions in the integer pipe. Only coprocessor instructions that have reached such a state are allowed to commit results in the coprocessor. Coprocessor based conditional branches are handled in graduation unit 126 using condition code information passed by coprocessor 122 though coprocessor interface unit 124 to graduation unit 126.

Coprocessor 122 also sends exception code information to graduation unit 126. Graduation unit 126 uses this information to set a completion bit in completion buffer 128. When the completion marked coprocessor instruction makes it to the top of graduation buffer 121, graduation unit 126 evaluates the exception codes and either commits, nulls or kills the coprocessor instruction by sending a control interface signal to coprocessor 122. Thus, no coprocessor state is committed until graduation unit 126 signals completion, kill or nullification of each coprocessor instruction. This allows for speculative issue of coprocessor instructions, as all issued coprocessor instructions will be graduated in-program order by graduation unit 126. In an embodiment, coprocessor instructions can be killed at any time (e.g., on a branch mis-prediction). It arrangement also allows for precise exceptions, as no coprocessor state is committed past an exception generating coprocessor instruction.

If data is to be written back from coprocessor 122, for example, to memory or register file 130, it is written back using execution units 102. In an embodiment, data is sent from coprocessor 122 either directly to load/store unit 108 (e.g., for storage in data cache 114) or to integer execution unit 118 (e.g., for storage in completion buffer 128 and/or register file 130).

As described herein, graduation unit 126 controls coprocessor 122 instruction graduation through a control signal. This control signal is sent to coprocessor 122 for every instruction to indicate, for example, either state commitment or instruction kill. In case of an instruction kill, all prior issued coprocessor instructions are flushed from the coprocessor pipe. This is used for flushing coprocessor 122, for example, on branch mis-predictions and exceptions.

TABLE 1

| Control Bits | Actions For A Floating Point Coprocessor |
|---|---|
| 0X | Commit state |
| 10 | Kill instruction (e.g., not due to an exception) |
| 11 | Kill instruction (e.g., due to exception) |

Table 1 above illustrates an example control signal (i.e., bit values) sent to a floating point coprocessor by graduation unit 126 according to an embodiment of the invention. In an embodiment, a null signal is used to prevent delay slot issued coprocessor instructions from updating the state of processor 100 if the instructions are not required to execute. If such coprocessor instructions have executed, they can be deleted using an instruction kill signal. In some coprocessors, kill signals are threaded and include use a program thread identification value to indicate which thread is being killed.

FIG. 3 illustrates an example in-order instruction queue 200 according to an embodiment of the invention. In-order instruction queue 200 includes an N-entry first-in-first-out memory structure 300. In an embodiment, memory structure 300 has eight entries. For each entry of memory structure 300, in-order instruction queue 200 preferably stores a valid identification value (V), a coprocessor load data queue identification value (CLDQid), a valid coprocessor load data queue identification value (VCLDQid), a program thread identification value (TID), and an instruction. In-order instruction queue 200 can have up to two instructions written to it per cycle from instruction dispatch unit 106, and coprocessor 122 can read up to two instructions per cycle.

In-order instruction queue 200 includes an allocator circuit 302 to control the number of valid instructions written to in-order instruction queue 200. Allocator circuit 302 includes an up/down counter 304. Counter 304 is incremented when an instruction is sent from instruction dispatch unit 106 and decremented when an instruction is sent to coprocessor 122. Allocator circuit 302 stalls instruction dispatch unit 106 using stall signal 312 if in-order instruction queue 200 fills up and instruction dispatch unit 106 attempts to send instructions to in-order instruction queue 200. A busy signal 310 from coprocessor 122 stalls in-order instruction queue 200 and stops the issue of instructions to coprocessor 122 if the pipeline of coprocessor 122 stalls. In-order instruction queue 200 in turn sends stall signal 312 to instruction dispatch unit 106 to avoid an overrun of in-order instruction queue 200. Control logic 306 receives as inputs a stall signal 308 from allocator circuit 302 and a busy signal 310 from coprocessor 122 to generate stall signal 312.

On issue of a load instruction, in-order instruction queue 200 sends coprocessor load data queue identification information to coprocessor load data queue 202 for load instruction coordination.

FIG. 4 illustrates an example coprocessor load data queue 202 according to an embodiment of the invention. Coprocessor load data queue 202 includes a memory structure 400 that stores the following values for each entry: a coprocessor load data queue identification value (CLDQid); a valid value (V); a ready value (R), a committed value (C); an issued value (I); an age value (AGE); a coprocessor identification value (COPid); a program thread identification value (TID); and data. In an embodiment, coprocessor load data queue 202 has eight entries and can be written to by load/store unit 108 and by instruction execution unit 118. Coprocessor load data queue 202 can be flushed on a program thread basis using the program thread identification values stored for each entry. In an embodiment, the width of the data stored for each entry is 64 bits. Coprocessor load data queue 202 is preferably shared between coprocessors in embodiments of processor 100 having more than one coprocessor. In such embodiments, coprocessor load data queue 202 has a read port for each coprocessor.

Data is sent to co-processor 122 from data cache 114 using load/store unit 108 and from completion buffer 128/register file 130 using integer execution unit 118. Because load/store unit 108 and integer execution unit 118 can execute instructions out-of-program order, data may be written to coprocessor load data queue 202 out-of-program order.

As described herein, in embodiments, coprocessor 122 memory load instructions are split into two instructions by instruction dispatch unit 106. These instructions are a load data instruction and a load address instruction. The load data instruction is sent to coprocessor 122, where it waits for data from either load/store unit 108 or integer execution unit 118. The load address instruction is sent to either load/store unit 108 or integer execution unit 118 depending on whether the data is coming from data cache 114 or from completion buffer 128/register file 130. Both load data and load address instructions write to the same entry of completion buffer 128, but they have different completion bits. The load data instruction at graduation signals committal to coprocessor 122 if no exceptions occurred.

Coprocessor load data queue 202 serves as a holding place for data and assures that a coprocessor instruction that will operate on the data is present in coprocessor 122 before the data is sent to coprocessor 122. In order to match data to its corresponding coprocessor instruction, a coprocessor load data queue entry and corresponding coprocessor load data queue identification value is assigned to coprocessor instructions. Instruction dispatch unit 106 stalls if coprocessor load data queue 202 is full and an instruction requires a coprocessor load data queue entry.

The coprocessor load data queue identification value is used as an index into memory structure 400. In an embodiment, the coprocessor load data queue identification value is hardwired and used for write address decoding. This identification value is assigned from a free list residing in instruction dispatch unit 106. When data is sent to coprocessor 122, the coprocessor load data queue identification value is returned to instruction dispatch unit 106 to free the associated entry of coprocessor load data queue 202.

Table 2 below outlines how status bits stored in memory structure 400 are generated/updated, for example, by control logic 402 as a result of various events.

TABLE 2

| | Valid | Ready | Committed | Issued | Age |
|---|---|---|---|---|---|
| Reset | 0 | 0 | 0 | 0 | X |
| Allocate | 1 | 0 | 0 | 0 | Youngest |
| Write back | NC | 1 | NC | NC | NC |
| IOIQ issue | NC | NC | NC | 1 | NC |
| Graduate | NC | NC | 1 | NC | NC |
| Read | 0 | 0 | 0 | 0 | Updated on all reads |
| Flush | 0 if not committed | 1 if committed | 1 if committed | 1 if committed | NC |

As shown in Table 2, on reset, the status bits are cleared. On allocation from instruction dispatch unit 106, the valid bit is set and the Age is set by control logic 402 to the Age of the youngest coprocessor load data queue entry for coprocessor 122. The youngest Age value (e.g., highest age value) effectively acts as a queue tail pointer.

When data is written into coprocessor data queue 202, the Ready bit is set. There is no change (NC) of the other values. The data cannot be sent to coprocessor 122, however, before the corresponding instruction is sent to coprocessor 122. Otherwise, coprocessor 122 would not know where the data belongs.

When the in-order instruction queue issues a corresponding instruction to coprocessor 122, the issue bit is set. The data, if ready, can then be sent to coprocessor 122.

When data is read out of coprocessor load data queue 202, all status bits are cleared. In addition, the queue entry is de-allocated in the free list for coprocessor load data queue 202 residing in instruction dispatch unit 106.

When a load instruction graduates, the committed bit is set. This is used in case of a flush as missed loads can return data after a flush, and the queue entry thus should not be flushed. On a flush, the valid bit for all non-committed entries is cleared. In an embodiment, these entries are not de-allocated, however, in order to simplify the Age mechanism. Instead, all committed entries are identified as ready and committed, making them available for immediate read by coprocessor 122. Because the valid bit is not set, no valid data is sent to coprocessor 122 when reading such "flushed" entries from coprocessor load data queue 202, but the entry is de-allocated in the instruction dispatch unit 106 free list for coprocessor load data queue 202.

On reads, any entry with an Age younger than the read entry must be decremented by control logic 402. In an embodiment, a value of zero signifies the oldest entry.

FIG. 5 illustrates an example store data identification queue 206 according to an embodiment of the invention. Store data identification queue 206 includes a first-in-first-out memory structure 500. The depth of memory structure 500 is equal to the depth of in-order instruction queue 200 plus the depth of the pipeline of coprocessor 122. In an embodiment, each entry of memory structure 500 stores a completion buffer identification value (CBID), a value indicating whether data from coprocessor 122 is to be written to completion buffer 128 (write to CB), a value indicating whether data form coprocessor 122 is to be written to data cache 114 (Write to Data Cache), and a program thread identification value (TID). Store data identification queue 206 is controlled/updated by control logic 502.

Store data identification queue 206 is written in-order from instruction dispatch unit 106. Store data identification queue 206 is read in-order by coprocessor 122 for each data store.

In embodiments, store data identification queue 206 can be flushed on a per threaded basis and compacted to remove flushed out entries, for example, using control logic 502. The program thread identification value is used to support this functionality. For coprocessors that do not implement multi-threading, there is no need to store program thread identification values in the store data identification queue associated with the coprocessor.

FIG. 6 illustrates an example condition codes queue (CCQ) 208 according to an embodiment of the invention. In an embodiment, condition codes queue 208 includes an N-entry first-in-first out memory structure 600. Each entry of memory structure 600 preferably stores a condition code value (CC), a valid value (V), and a program thread identification value (TID).

As coprocessor instructions execute, they write resulting condition codes in condition codes queue 208 and set the corresponding valid bits. When an instruction graduates, condition codes queue 208 is read, and the appropriate valid bit cleared. Condition codes queue 208 can be flushed on branch mis-predictions. In embodiments, condition codes queue 208 can be flushed and compacted on a per program threaded basis, for example, using control logic 602, which controls condition codes queue 208.

FIG. 7 illustrates an example exception completion buffer identification queue (ECQ) 210 according to an embodiment of the invention. Exception completion buffer identification queue 210 includes a first-in-first-out memory structure 700 that stores completion buffer identification (CBID) values and program thread identification (TID) values for coprocessor instructions issued to coprocessor 122 by instruction dispatch unit 106 under the control of control logic 702. The depth of memory structure 700 is equal to the depth of in-order instruction queue 200 plus the depth of the pipeline of coprocessor 122. In an embodiment, the exception code produced by each coprocessor instruction is written to completion buffer 128. The exception completion buffer identification queue is written to by instruction dispatch unit 106 and read when coprocessor 122 produces instruction exception codes.

Execution units 102 receive exception codes from coprocessor 122 for coprocessor instructions. The exception codes identify whether an exception occurred. Coprocessor 122 returned exception codes are matched up in-order with exception completion buffer identification queue 210 and written into completion 128. They are read by graduation unit 126 out of completion buffer 128. In an embodiment, two entries are read from exception completion buffer identification queue 210 per cycle, thereby allowing two coprocessor instructions to write-back per cycle.

TABLE 3

| Exception Code | Exception |
|---|---|
| 000 | No Exception |
| 001 | Reserved Instruction Exception |
| 010 | Floating Point Exception |
| 011 | User-defined Implementation Specific Exception |
| 100 | Coprocessor 2 exception |
| 101-111 | Reserved |

Table 3 above illustrates one example of exception codes that can be implemented by processor 100.

FIG. 8 illustrates an example completion buffer identification queue (CBIDQ) 800 according to an embodiment of the invention. Completion buffer identification queue 800 includes a first-in-first-out memory structure 802 that stores completion buffer identification (CBID) values and program thread identification (TID) values for coprocessor instructions issued to coprocessor 122 by instruction dispatch unit 106. Memory structure 802 also stores condition code values (CC), condition code expected value (CC Expected), condition code received value (CC received), exception received value (EXP Received), exception valid value (EXP Valid) and exception code value (EXP). Memory structure 802 is an N-entry memory structure. In an embodiment, the depth of memory structure 802 is equal to the depth of in-order instruction queue 200 plus the depth of the pipeline of coprocessor 122. In an embodiment, the exception code value (EXP) and condition code value (CC) for a coprocessor instruction are written to completion buffer 128 and read by graduation unit 126.

Completion buffer identification queue 800 combines the functionality of exception completion buffer identification queue 210 and condition code queue 208. In an example, completion buffer 126 may require receipt of condition codes prior to receipt of exception codes for a coprocessor instruction. In this case, a distinct exception completion buffer identification queue 210 and condition code queue 208 will require synchronization between the exception completion buffer identification queue 210 and the condition code queue 208 prior to sending exceptions or condition codes to completion buffer 126. As explained below, combining the functionality of exception completion buffer identification queue 210 and condition code queue 208 into completion buffer identification queue 800 with the addition of CC Expected, CC Received and EXP Received fields allows for synchronization of exception code values and condition code values of an instruction before writing to completion buffer 128.

The CC Expected field is used to determine whether a coprocessor instruction expects to receive a condition code value. If a condition code value is expected, then the corresponding value exception code value in EXP field for that instruction will not be sent to completion buffer 128 until the condition code value is received. When the condition code is received, the CC Received field is set as 1 and the corresponding exception code value in EXP field can be sent along with condition code value in the CC field. If it is determined, for example by control logic 804, that a condition code value is not expected for a particular coprocessor instruction, then the CC Expected field is initialized to 0 and the CC Received field is initialized to 1 for that instruction. Initializing the CC Expected and CC Received fields, upon determining that a condition code value is not expected, allows the exception code in the EXP field to be sent to completion buffer 128 without waiting for a condition code to become available. The EXP Received field is used to indicate whether the exception code has been received and the EXP Valid field is used to indicate whether the exception code is valid. In this embodiment, exception completion buffer identification queue 210 and condition code queue 208 can be removed and replaced by completion buffer identification queue 800. In embodiments, completion buffer identification queue 800 can be flushed and compacted on a per program threaded basis, for example, using control logic 804, which controls completion buffer identification queue 802.

FIG. 9 is a diagram of an example system 900 according to an embodiment of the present invention. System 900 includes a processor 902, a memory 904, an input/output (I/O) controller 906, a clock 908, and custom hardware 910. In an embodiment, system 900 is a system on a chip (SOC) in an application specific integrated circuit (ASIC).

Processor 902 is any processor that includes features of the present invention described herein and/or implements a method embodiment of the present invention. In one embodiment, processor 902 includes an instruction fetch unit, an instruction cache, an instruction decode and dispatch unit, one or more instruction execution unit(s), a data cache, a register file, and a bus interface unit similar to processor 100 described above.

Memory 904 can be any memory capable of storing instructions and/or data. Memory 904 can include, for example, random access memory and/or read-only memory.

Input/output (I/O) controller 906 is used to enable components of system 900 to receive and/or send information to peripheral devices. I/O controller 906 can include, for example, an analog-to-digital converter and/or a digital-to-analog converter.

Clock 908 is used to determine when sequential subsystems of system 900 change state. For example, each time a clock signal of clock 908 ticks, state registers of system 900 capture signals generated by combinatorial logic. In an embodiment, the clock signal of clock 908 can be varied. The clock signal can also be divided, for example, before it is provided to selected components of system 900.

Custom hardware 910 is any hardware added to system 900 to tailor system 900 to a specific application. Custom hardware 910 can include, for example, hardware needed to decode audio and/or video signals, accelerate graphics operations, and/or implement a smart sensor. Persons skilled in the relevant arts will understand how to implement custom hardware 910 to tailor system 900 to a specific application.

While various embodiments of the present invention have been described above, it should be understood that they have been presented by way of example, and not limitation. It will be apparent to persons skilled in the relevant computer arts that various changes can be made therein without departing from the scope of the invention. Furthermore, it should be appreciated that the detailed description of the present invention provided herein, and not the summary and abstract sections, is intended to be used to interpret the claims. The summary and abstract sections may set forth one or more but not all exemplary embodiments of the present invention as contemplated by the inventors.

For example, in addition to implementations using hardware (e.g., within or coupled to a Central Processing Unit ("CPU"), microprocessor, microcontroller, digital signal processor, processor core, System on Chip ("SOC"), or any other programmable or electronic device), implementations may also be embodied in software (e.g., computer readable code, program code and/or instructions disposed in any form, such as source, object or machine language) disposed, for example, in a computer usable (e.g., readable) medium configured to store the software. Such software can enable, for example, the function, fabrication, modeling, simulation, description, and/or testing of the apparatus and methods described herein. For example, this can be accomplished through the use of general programming languages (e.g., C, C++), hardware description languages (HDL) including Verilog HDL, VHDL, SystemC Register Transfer Level (RTL) and so on, or other available programs, databases, and/or circuit (i.e., schematic) capture tools. Such software can be disposed in any known computer usable storage medium including semiconductor, magnetic disk, and optical disk (e.g., CD-ROM, DVD-ROM, etc.). Such software can also be disposed as a computer data signal embodied in a computer usable (e.g., readable) transmission medium (e.g., carrier wave or any other medium including digital, optical, or analog-based medium). As such, the software can be transmitted over communication networks including the Internet and intranets.

It is understood that the apparatus and method embodiments described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalence.

What is claimed is:

1. A hardware processor, comprising:
an execution unit that executes instructions out of program order;
a coprocessor that executes instructions in program order; and
a coprocessor interface unit, coupled between the execution unit and the coprocessor, the coprocessor interface unit including a coprocessor load data queue that stores data received from the execution unit until an instruction that operates upon the data is present within the coprocessor,
wherein the data may be written to the coprocessor load data queue out of program order, and
wherein the coprocessor load data queue comprises a plurality of entries, and each entry has a plurality of associated status values including a valid bit that is set upon allocation, a ready bit that is set upon the date being written into the coprocessor load data queue, a committed bit that is set upon a load instruction graduating, and an issued bit that is set when an in-order instruction queue issues a corresponding instruction to the coprocessor.

2. The processor of claim 1, wherein the coprocessor load data queue comprises a plurality of entries, and each entry has an associated age value.

3. The processor of claim 2, wherein the coprocessor interface unit further includes control logic, coupled to the coprocessor load data queue, that generates age values.

4. The processor of claim 1, wherein the coprocessor load data queue comprises a plurality of entries, and each entry has an associated program thread identification value.

5. The processor of claim 1, wherein the processor further comprises a second coprocessor coupled to the coprocessor interface unit, and the coprocessor load data queue comprises a plurality of entries, and each entry has an associated coprocessor identification value.

6. The processor of claim 1, wherein the coprocessor interface unit further includes the in-order instruction queue that stores instructions to be executed by the coprocessor.

7. The processor of claim 6, wherein the in-order instruction queue comprises a first-in-first-out buffer.

8. A system, comprising:
a hardware processor having:
an execution unit that executes instructions out of program order,
a coprocessor that executes instructions in program order, and
a coprocessor interface unit, coupled between the execution unit and the coprocessor, the coprocessor interface unit including a coprocessor load data queue that stores data received from the execution unit until an instruction that operates upon the data is present within the coprocessor; and
memory coupled to the processor,
wherein the data may be written to the coprocessor load data queue out of program order, and
wherein the coprocessor load data queue comprises a plurality of entries, and each entry has a plurality of associated status values including a valid bit that is set upon allocation, a ready bit that is set upon the date being written into the coprocessor load data queue, a committed bit that is set upon a load instruction graduating, and an issued bit that is set when an in-order instruction queue issues a corresponding instruction to the coprocessor.

9. The system of claim 8, wherein the coprocessor load data queue comprises a plurality of entries, and each entry has an associated age value.

10. The system of claim 8, wherein the coprocessor load data queue comprises a plurality of entries, and each entry has an associated program thread identification value.

11. The processor of claim 8, wherein the processor further comprises a second coprocessor coupled to the coprocessor interface unit, and the coprocessor load data queue comprises a plurality of entries, and each entry has an associated coprocessor identification value.

12. The processor of claim 8, wherein the coprocessor interface unit further includes the in-order instruction queue that stores instructions to be executed by the coprocessor.

13. A computer readable storage medium configured to store program code having embodied thereon computer readable program code for generating a processor, the computer readable program code comprising:
computer readable program code to generate an execution unit that executes instructions out of program order;
computer readable program code to generate a coprocessor that executes instructions in program order; and
computer readable program code to generate a coprocessor interface unit, coupled between the execution unit and the coprocessor, the coprocessor interface unit including a coprocessor load data queue that stores data received from the execution unit until an instruction that operates upon the data is present within the coprocessor,
wherein the data may be written to the coprocessor load data queue out of program order, and
wherein the coprocessor load data queue comprises a plurality of entries, and each entry has a plurality of associated status values including a valid bit that is set upon allocation, a ready bit that is set upon the date being written into the coprocessor load data queue, a committed bit that is set upon a load instruction graduating, and an issued bit that is set when an in-order instruction queue issues a corresponding instruction to the coprocessor.

14. The computer readable storage medium of claim 13, wherein the coprocessor load data queue comprises a plurality of entries, and each entry has an associated age value.

15. The computer readable storage medium of claim 13, wherein the coprocessor load data queue comprises a plurality of entries, and each entry has an associated program thread identification value.

16. The computer readable storage medium of claim 13, further comprising computer readable program code to generate a second coprocessor coupled to the coprocessor interface unit, and the coprocessor load data queue comprises a plurality of entries, and each entry has an associated coprocessor identification value.

17. The computer readable storage medium of claim 13, wherein the coprocessor interface unit further includes the in-order instruction queue that stores instructions to be executed by the coprocessor.

18. The computer readable storage medium of claim 13, wherein the computer readable program code is written using hardware description language software.

19. The computer readable storage medium of claim 18, wherein the computer readable program code is written in one of Verilog hardware description language software and VHDL hardware description language software.

20. A method for interfacing a coprocessor that executes instructions in program order to an execution unit that executes instructions out of program order, the method comprising:
dispatching a first instruction to the execution unit and a second instruction to the coprocessor;
storing data retrieved from a memory location specified by the first instruction in an entry of a coprocessor load data queue;
providing the data to the coprocessor when the second instruction is present within the coprocessor, and
assigning a plurality of status values to the data, wherein a valid bit is set upon allocation, a ready bit is set upon the date being written into the coprocessor load data queue, a committed bit is set upon a load instruction graduating, and an issued bit is set when an in-order instruction queue issues a corresponding instruction to the coprocessor,
wherein the data may be provided to the coprocessor load data queue out of program order.

21. The method of claim 20, further comprising:
assigning an age value to the data.

22. The method of claim 20, further comprising:
assigning a program thread identification value to the data.

23. The method of claim 20, further comprising:
assigning a coprocessor identification value to the data.

24. The method of claim 20, further comprising:
storing the second instruction in the in-order instruction queue before the second instruction is issued to the coprocessor.

25. A method for interfacing a coprocessor that executes instructions in program order to an execution unit that executes instructions out of program order, the method comprising:

storing data, retrieved by the execution unit from a memory location specified by a first instruction, in an entry of a coprocessor load data queue;

assigning a plurality of status values to the data, wherein a valid bit is set upon allocation, a ready bit is set upon the data being written into the coprocessor load data queue, a committed bit is set upon a load instruction graduating, and an issued bit is set when an in-order instruction queue issues a corresponding instruction to the coprocessor; and providing the data to the coprocessor when a second instruction that operates on the data is present within the coprocessor, wherein the data may be provided to the coprocessor load data queue out of program order.

26. The method of claim 25, wherein the assigning step comprises:

assigning an age value to the data.

27. The method of claim 25, wherein the assigning step comprises:

assigning a program thread identification value to the data.

28. The method of claim 25, wherein the assigning step comprises:

assigning a coprocessor identification value to the data.

29. A computer readable storage medium configured to store program code having embodied thereon computer readable program code for generating a computer, the computer readable program code comprising:

computer readable program code to generate an execution unit that executes instructions out of program order;

computer readable program code to generate a coprocessor that executes instructions in program order; and computer readable program code to generate a coprocessor interface unit, coupled between the execution unit and the coprocessor, the coprocessor interface unit including a coprocessor load data queue that stores data received from the execution unit until an instruction that operates upon the data is present within the coprocessor, wherein the data may be written to the coprocessor load data queue out of program order, and wherein the coprocessor load data queue comprises a plurality of entries, and each entry has a plurality of associated status values including a valid bit that is set upon allocation, a ready bit that is set upon the date being written into the coprocessor load data queue, a committed bit that is set upon a load instruction graduating, and an issued bit that is set when an in-order instruction queue issues a corresponding instruction to the coprocessor.

\* \* \* \* \*